United States Patent [19]

Seubert et al.

[11] Patent Number: 5,781,353
[45] Date of Patent: Jul. 14, 1998

[54] EXTERIOR REARVIEW MIRROR

[76] Inventors: Richard Seubert, Brückenstrasse 19, Bürgstadt, Germany, D-63927; Karl-Josef Marks, Am Dreispitz 18, Collenberg, Germany, D-97903

[21] Appl. No.: 574,180

[22] Filed: Dec. 18, 1995

[30] Foreign Application Priority Data

Dec. 17, 1994 [DE] Germany .............. 9420273 U

[51] Int. Cl.$^6$ .............. G02B 7/182; B60R 1/06
[52] U.S. Cl. .............. 359/841; 359/872; 359/877; 248/478; 248/488
[58] Field of Search .............. 359/841, 872, 359/877; 248/475.1, 476, 477, 478, 488

[56] References Cited

U.S. PATENT DOCUMENTS

| | | | |
|---|---|---|---|
| 3,972,597 | 8/1976 | Repay et al. | 359/877 |
| 4,125,244 | 11/1978 | Lukey | 248/478 |
| 4,277,140 | 7/1981 | Manzoni . | |
| 4,488,778 | 12/1984 | Polzer . | |
| 4,830,327 | 5/1989 | Fimeri | 359/876 |
| 4,877,214 | 10/1989 | Toshiaki et al. | 359/877 |
| 4,951,912 | 8/1990 | Manzoni | 248/475.1 |
| 4,981,279 | 1/1991 | Andreas et al. | 359/872 |
| 4,998,814 | 3/1991 | Perry | 359/871 |
| 5,031,871 | 7/1991 | Ohta et al. . | |
| 5,245,480 | 9/1993 | Polzer . | |
| 5,313,336 | 5/1994 | Sakao et al. | 359/841 |
| 5,331,471 | 7/1994 | Gilbert | 359/877 |

FOREIGN PATENT DOCUMENTS

| | | |
|---|---|---|
| 1173433 | 7/1985 | European Pat. Off. . |
| 0620138 | 3/1994 | European Pat. Off. . |
| 2314642 | 6/1976 | France . |
| 2501600 | 3/1981 | France . |
| 2504075 | 4/1981 | France . |
| 89 14 759.6 | 5/1991 | Germany . |
| 4204621 | 2/1992 | Germany . |
| 41 30 176 | 3/1993 | Germany . |
| 62-170346 | 10/1987 | Japan .............. 359/877 |
| 0124342 | 5/1990 | Japan .............. 359/877 |

*Primary Examiner*—Ricky D. Shafer
*Attorney, Agent, or Firm*—Jacobson, Price, Holman & Stern, PLLC

[57] ABSTRACT

An external mirror for a motor vehicle which includes a mirror base which can be fixed to the body of the vehicle, a mirror housing which is swingable with respect to the base and which surrounds the mirror glass on all sides and projects rearwardly of the glass to form a generally encircling bead structure, a mounting plate which bears the mirror glass, a cap part which is releasably fixable to the mounting plate, and a base part of the mirror housing. To improve the appearance of the mirror device, the cap part of the housing is constructed to project rearwardly beyond the plane of the mirror glass, with the rearward projecting part of the cap forming at least a substantial part of the edge bead.

8 Claims, 2 Drawing Sheets

1

EXTERIOR REARVIEW MIRROR

FIELD OF THE INVENTION

The present invention relates to an external mirror for a motor vehicle, having a mirror base which can be fixed to the body of the vehicle, a mirror housing which is swingable with respect to the base and which surrounds the mirror glass on all sides and projects rearwardly of the glass to form a generally encircling bead structure, a mounting plate which bears the mirror glass, a cap part of the mirror housing which is releasably fixable to the mounting plate, and a base part of the mirror housing.

BACKGROUND OF THE INVENTION

Ger. Gbm. 89 14 759 and its U.S. Counterpart Pat. No. 5,245,480 discloses an external mirror for a motor vehicle having a cap which can be mounted by plug and socket means. The mirror housing is divided by a cut or cuts in its front region, and the cap, which covers the open forwardly projecting parts of the mounting plate, is releasably fixed to the mounting plate. The division of the mirror housing into a separately suppliable cap part and base part, wherewith the base part can also be fixed to the mounting plate, provides the advantage, among others, that the color of the essential visible parts of the external mirror can be matched to the color of the given vehicle body, without the need to keep a complete mirror device in inventory for each vehicle body/ mirror housing color.

In Ger. OS 41 30 176 it is proposed that at least a part of the external mirror assembly without housing be mounted on the vehicle, followed by plug-like mounting of the entire mirror housing as an integral unit over the pre-mounted part, using catch members and plate springs. This does indeed solve the problem of matching the color of the mirror housing, indeed the entire housing, to that of the vehicle body. However, the appearance of the housing, particularly when viewed from the front, is not sleek, due to the arrangement which for technical reasons is bulky.

Accordingly, the underlying problem of the present invention is to provide improvements in the appearance of a mirror device of the type described above.

SUMMARY OF THE INVENTION

This problem is solved according to the present invention in that the cap is constructed to project rearwardly beyond the plane of the mirror glass, with the rearward projecting part of the cap forming at least a substantial part of the edge bead. The present invention allows for the mirror housing to be supplied in two parts, to coordinate with the two-color design of the body of many vehicles. For example, the base part of the housing may have a dark color to correspond with the lower, protective region (bumpers etc.) of the vehicle body.

According to a refinement of the present invention, the entire edge bead is part of the housing cap, and only the bottom side of the housing remains in a darker color. The entire edge bead when viewed from the rear (in particular, from the driver's seat) will have the same color as the main part of the vehicle body paint.

It is also advantageous if the cap can be mounted by pushing it over the housing base part from above, wherewith the cap is fixed to the mounting structure (mounting plate) by catch means (which may be spring-loaded).

It is further advantageous if, as at least a part of the secure catch-mounting of the cap, a plate spring provided on the mounting structure form interlockingly engages a projection provided on the cap.

It is recommended that, to facilitate removal of the cap, an opening be provided in the cap or the base part of the housing, to allow the spring to be deflected by an implement, thereby releasing the cap.

Advantageously, clip means are provided whereby the base part of the housing can be independently fixed to the mounting structure.

BRIEF DESCRIPTION OF THE DRAWINGS

The invention will be described in more detail hereinbelow, with reference to an exemplary embodiment which is illustrated in the accompanying drawings.

DETAILED DESCRIPTION OF THE PREFERRED EMBODIMENTS

Figure 1:
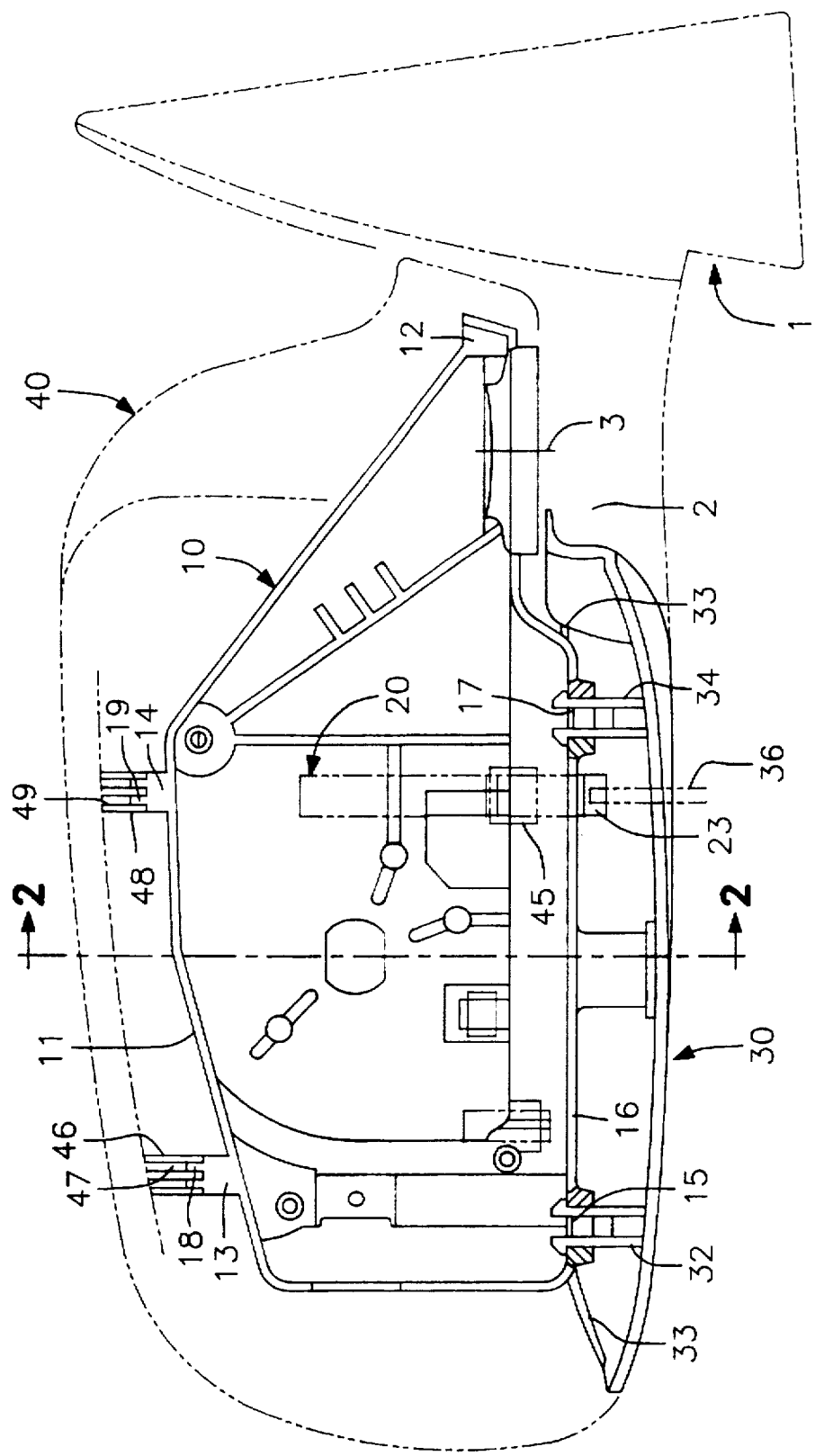
FIG. 1 is a schematic view of a mounting plate of an external mirror with a base part and a cap part indicated.

A mounting plate 10 is shown in FIG. 1, which plate is swingably connected to a mirror base 1 (as shown in dotted lines) via an articulation 2 with swing axis 3, which axis extends essentially vertically when the mirror device is in its position mounted on a vehicle. The mounting plate 10, which has various profile features for purposes of reinforcement, serves to bear the mirror glass 5 via an adjusting mechanism 4 which enables adjustment of the mirror 5 into a desired position relative to the mounting plate 10, which adjustment can be accomplished from the interior of the vehicle.

The lower edge 16 of the mounting plate 10 extends outward from the mirror base 1 and also rearward, and includes two openings (15, 17) which are disposed at a distance apart.

The upper edge 11 of the mounting plate 10 extends essentially in the same direction as the lower edge 16, and has two upwardly extending upright members (13, 14) which are disposed at a distance apart. Each upright member (13, 14) has projecting fingers (18, 19) on its free end.

A plate spring 20 having a plurality of bends is welded to the front side of the mounting plate 10. A first segment 21 of the spring extends downward and forward. This is followed by an acute angle and then a segment 22 which extends generally rearward to a point slightly forward of the mounting plate 10. Segment 22 is followed by a segment which extends generally downward beyond the edge 16 of the mounting plate, then generally horizontally, and the plate spring terminates in a bent-away hook 23.

A base part 30 which forms the lower part of the mirror housing is comprised of a contoured sheet of plastic having two pairs of spreading fingers (32, 34) which extend upward from its inner side. The distance between the centers of the pair of fingers (32, 34) is equal to the distance between the openings (15, 17) in the mounting plate 10. The free end of each of the spreading fingers (32, 34) bears a hook configuration which can elastically catch on the mounting plate after passing through the respective opening (15, 17). In this way the base part 30 can be snapped onto the mounting plate 10 from underneath.

Figure 2:
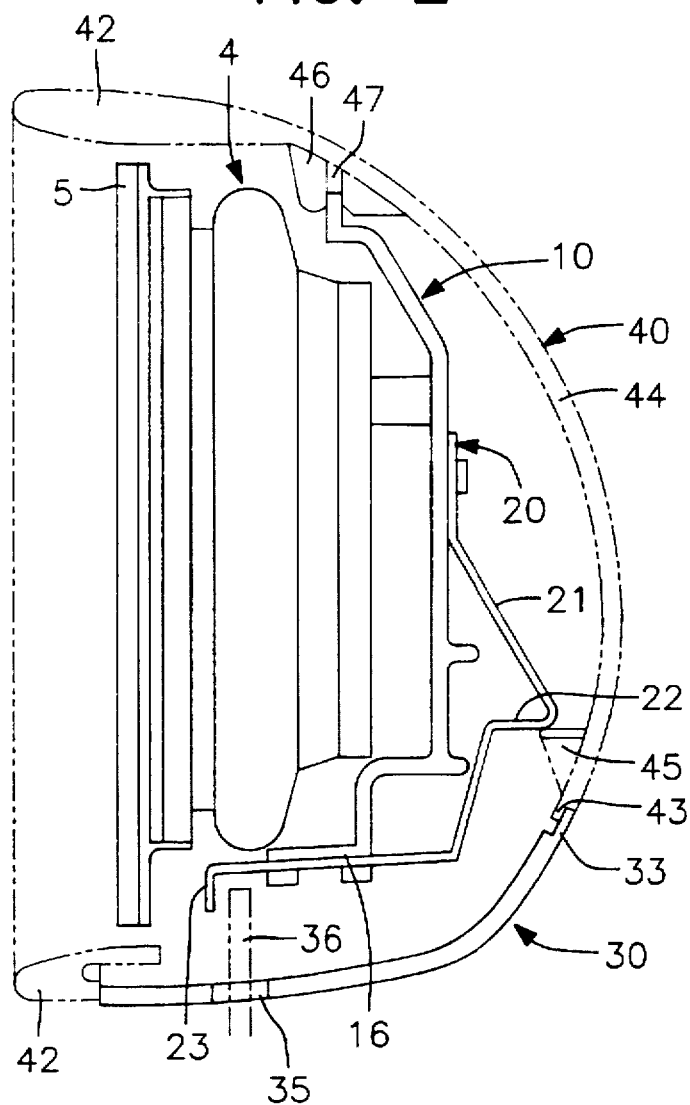
FIG. 2 is a cross section through the external mirror of FIG. 1, along line II—II.

The remainder of the mirror housing is comprised of a cap part 40 which can be slid over the mounting plate 10. The cap 40 has a bead structure 42 at its rear edge, which surrounds the mirror glass 5 on all sides when the cap part 40 is installed, extends rearward beyond the mirror glass 5, and overlaps the base part 30 at the lower part of the bead 42 (FIG. 2).

The front region 44 of the cap 40 has a three-dimensionally convex (rotund) shape, and covers the front of the mounting plate 10 and plate spring 20. As seen from FIG. 2, the cap part 40 and base part 30 together form a housing for the mirror device.

Nubs (46, 48) extend generally downward from the upper inner surface of the cap 40, above the uprights (13, 14), to facilitate the mounting of the cap 40. Each such nub has pockets (47, 49) in it, in which respective fingers (18, 19) of the uprights (13, 14) can be accommodated, wherewith for a given nub a pocket is provided for each of the fingers (FIG. 1). When the cap 40 is pushed into place from above, the fingers (18, 19) engage the pockets (47, 49) until the nubs (46, 48) abut against the respective uprights (13, 14), providing a depth reference engagement.

An abutting-plate member 12 is formed on the mounting plate 10 between the swing axis 3 and the mirror base 1. When the cap 40 is installed, its corresponding structure abuts against the abutting-plate member 12. The member 12 constrains the cap 40 in the direction extending away from the mirror base.

A shoulder or shelf 45 projects from the inner surface of the front region 44 of the cap member 40, near the lower edge of the cap member. When the cap 40 is being installed, the shoulder 45 presses the segment 21 of the plate spring 20 rearward until the segment 22 of the spring 20 snaps forward over the shoulder 45.

The lower edge of the front cap region 44 has a lap configuration 43 which engages a corresponding configuration 33 on the base part 30 of the mirror housing, wherewith a lap joint is formed when the cap 40 is installed in plug fashion on the mounting plate 10.

Additional securing elements may be provided on the inner surface of the cap region 44 and the front side of the mounting plate 10, which elements interengage when the cap 40 is installed on the plate 10, whereby the cap 40 is held in place without vibrating but can be released for removal, by appropriate release means.

In the embodiment shown, an opening 35 is provided to facilitate removal of the cap 40 by raising it upward from the mounting plate 10. This opening 35 is disposed below and forward of the hook member 23 of the plate spring 20. An implement 36 (shown in dotted lines), e.g. a screwdriver, may be inserted through opening 35 to more the hook 23 rearward until the spring segments 21 and 22 clear the shoulder 45, allowing the cap 40 to be readily lifted upward. Obviously, the opening 35 may be provided in the front cap region 44 or another hidden location on the mirror housing.

We claim:

1. An external mirror for a motor vehicle, said external mirror comprising:

a mirror base fixable to a body of the motor vehicle, a mirror housing swingable with respect to the mirror base and surrounding a mirror glass on all sides and projecting rearwardly of the mirror glass to form an encircling edge bead structure, a mounting plate bearing the mirror glass, said mounting plate being within said mirror housing, wherein said mirror housing includes a cap part releasably fixable to the mounting plate and a base part, wherein said cap part is mountable over said mounting plate from above said mounting plate, and said cap part is fixed to said mounting plate by two holding elements, said cap part projecting rearwardly beyond a plane of the mirror glass, said cap part including a rearwardly projecting portion forming at least a substantial part of said encircling edge bead structure.

2. An external mirror according to claim 1, wherein said base part of said mirror housing surrounds an underside of said mounting plate.

3. An external mirror according to claim 1 wherein said encircling edge bead structure is entirely part of said cap part of said mirror housing.

4. An external mirror according to claim 1, wherein said base part of said mirror housing is attachable to said mounting plate by at least one pair of elastic fingers.

5. An external mirror according to claim 1, wherein a contact element is provided on said mounting plate, said contact element abuts said cap part, wherewith when said cap part is mounted on said mounting plate, said contact element holdingly constrains said mounting plate from movement in a direction directed away from said mirror base.

6. An external mirror for a motor vehicle, said external mirror comprising:

a mirror base fixable to a body of the motor vehicle, a mirror housing swingable with respect to the mirror base and surrounding a mirror class on all sides and projecting rearwardly of the mirror glass to form an encircling edge bead structure a mounting plate bearing the mirror glass, said mounting plate being within said mirror housing, wherein said mirror housing includes a cap part releasably fixable to the mounting plate and a base part, wherein said cap part is mountable over said mounting plate from above said mounting plate, and said cap part is fixed to said mounting plate by two holding elements, said cap part projecting rearwardly beyond a plane of the mirror glass, said cap part including a rearwardly projecting portion forming at least a substantial part of said encircling edge bead structure, wherein one of said two holding elements is a spring having an undercut configuration, said spring is fixed to said mounting plate and is bent to interlockingly engage the other of said two holding elements which is a shelf projecting from said cap part.

7. An external mirror according to claim 6, wherein an opening is provided in said base part of said mirror housing to allow the engagement of said spring with said cap part to be released by intervention from an exterior of said base part.

8. An external mirror for a motor vehicle, said external mirror comprising:

a mirror base fixable to a body of the motor vehicle, a mirror housing swingable with respect to the mirror base and surrounding a mirror glass on all sides and projecting rearwardly of the mirror glass to form an encircling edge bead structure, a mounting plate bearing the mirror glass, said mounting plate being within said mirror housing, wherein upright members extend upward from said mounting plate, said upright members having fingers, wherein said mirror housing includes:

a cap part releasably fixable to the mounting plate, and a base part, said cap part projecting rearwardly beyond a plane of the mirror glass, said cap part including a rearwardly projecting portion forming at least a substantial part of said encircling edge bead structure, said cap part mounted on said mounting plate such that said fingers engage nubs provided on said cap part.

* * * * *